United States Patent
Smith et al.

(10) Patent No.: US 11,279,859 B2
(45) Date of Patent: Mar. 22, 2022

(54) METHODS OF PASSIVATING ADHESIVES

(71) Applicant: 3M INNOVATIVE PROPERTIES COMPANY, St. Paul, MN (US)

(72) Inventors: Matthew R. D. Smith, Woodbury, MN (US); Matthew S. Stay, Minneapolis, MN (US); Mikhail L. Pekurovsky, Bloomington, MN (US); Daniel J. Theis, Mahtomedi, MN (US); Thomas J. Metzler, St. Paul, MN (US); Shawn C. Dodds, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 50 days.

(21) Appl. No.: 16/463,688

(22) PCT Filed: Nov. 29, 2017

(86) PCT No.: PCT/US2017/063572
§ 371 (c)(1),
(2) Date: May 23, 2019

(87) PCT Pub. No.: WO2018/106489
PCT Pub. Date: Jun. 14, 2018

(65) Prior Publication Data
US 2019/0322906 A1    Oct. 24, 2019

Related U.S. Application Data

(60) Provisional application No. 62/582,981, filed on Nov. 8, 2017, provisional application No. 62/431,124, filed on Dec. 7, 2016.

(51) Int. Cl.
*C09J 7/00* (2018.01)
*B32B 7/00* (2019.01)
(Continued)

(52) U.S. Cl.
CPC ............. *C09J 7/403* (2018.01); *B32B 7/12* (2013.01); *B32B 37/12* (2013.01); *B32B 38/145* (2013.01);
(Continued)

(58) Field of Classification Search
None
See application file for complete search history.

(56) References Cited

U.S. PATENT DOCUMENTS

| 4,472,480 A | 9/1984 | Olson |
| 4,736,048 A | 4/1988 | Brown |

(Continued)

FOREIGN PATENT DOCUMENTS

| WO | WO 2006-026189 | 3/2006 |
| WO | WO 2011-129831 | 10/2011 |

(Continued)

OTHER PUBLICATIONS

International Search Report for PCT International Application No. PCT/US2017/063572, dated Mar. 9, 2018, 3 pages.

*Primary Examiner* — Linda L Gray
(74) *Attorney, Agent, or Firm* — James A. Baker (57) ABSTRACT

Methods of passivating an adhesive via printing an ink onto a release liner, and adhesive articles or products made by the same are provided. An ink pattern is printed onto a release liner to form a pattern of features. The features are at least partially embedded in an adhesive layer such that when the release liner is peeled from the adhesive layer, the passivation features remain with the layer of adhesive to form selected areas having adjusted adhesive functionality. Articles including the passivated adhesive on a release liner are also disclosed.

10 Claims, 5 Drawing Sheets

(51) Int. Cl.
*B32B 37/00* (2006.01)
*B32B 38/00* (2006.01)
*C09J 5/00* (2006.01)
*G01N 21/00* (2006.01)
*C09J 7/40* (2018.01)
*C09J 7/38* (2018.01)
*B32B 7/12* (2006.01)
*B32B 37/12* (2006.01)
*G01N 21/64* (2006.01)

(52) U.S. Cl.
CPC . *C09J 5/00* (2013.01); *C09J 7/38* (2018.01); *G01N 21/64* (2013.01); *Y10T 156/10* (2015.01)

(56) References Cited

U.S. PATENT DOCUMENTS

| | | | |
|---|---|---|---|
| 4,980,443 A | 12/1990 | Kendziorski | |
| 6,358,353 B1* | 3/2002 | Maliner | B65C 9/44 |
| | | | 156/256 |
| 6,475,325 B1* | 11/2002 | Parrish | B65H 35/0013 |
| | | | 156/265 |
| 7,344,618 B2 | 3/2008 | Hannington | |
| 8,847,185 B2 | 9/2014 | Theis | |
| 8,992,104 B2 | 3/2015 | Carlson | |
| 9,296,583 B2 | 3/2016 | Theis | |
| 9,322,093 B2 | 4/2016 | Pekurovsky | |
| 9,556,510 B2 | 1/2017 | Pekurovsky | |
| 9,766,732 B2 | 9/2017 | Gilman | |
| 9,807,871 B2 | 10/2017 | Theis | |
| 2001/0052384 A1 | 12/2001 | Hannington | |
| 2008/0299346 A1 | 12/2008 | Onderisin | |
| 2010/0196664 A1 | 8/2010 | Kuiper | |
| 2012/0123220 A1 | 5/2012 | Iyer | |

FOREIGN PATENT DOCUMENTS

| | | |
|---|---|---|
| WO | WO 2011-129832 | 10/2011 |
| WO | WO 2014-179660 | 11/2014 |
| WO | WO 2015-195344 | 12/2015 |
| WO | WO 2015-195620 | 12/2015 |
| WO | WO 2018-039584 | 3/2018 |

* cited by examiner

METHODS OF PASSIVATING ADHESIVES

CROSS REFERENCE TO RELATED APPLICATIONS

This application is a national stage filing under 35 U.S.C. 371 of PCT/US2017/063572, filed Nov. 29, 2017, which claims the benefit of U.S. Application No. 62/431,124, filed Dec. 7, 2016, and U.S. Application No. 62/582,981, filed Nov. 8, 2017, the disclosure of which is incorporated by reference in its/their entirety herein.

TECHNICAL FIELD

The present disclosure relates to methods of selectively passivating an adhesive via printing an ink pattern onto a release liner and transfer the ink pattern to the adhesive, and articles or devices made by the same.

BACKGROUND

Adhesive articles or products are widely available. Some adhesive products include an adhesive composition disposed on a backing (e.g., a tape). The products can have utility in bonding to various surfaces or substrates for numerous applications.

SUMMARY

There is a desire to adjust adhesive functionality in selected areas of an adhesive article. Briefly, in one aspect, the present disclosure describes a method including providing a release liner having a release surface, printing an ink pattern onto the release surface of the release liner to form a passivation layer including a pattern of passivation features projecting away from the release surface, and providing a layer of adhesive onto the release surface of the release liner. The passivation layer is sandwiched between the release liner and the layer of adhesive. The passivation features are at least partially embedded in a major surface of the layer of adhesive such that when the release liner is peeled from the layer of adhesive, the passivation layer remains with the layer of adhesive to form one or more selected areas on the major surface of the layer of adhesive. The selected areas have an adhesive functionality different from the rest of the major surface of the layer of adhesive. In some embodiments, the layer of adhesive is provided by laminating a layer of pressure sensitive adhesive (PSA) onto the release surface of the release liner. In some embodiments, the layer of adhesive is provided by coating a layer of fluid adhesive onto the release surface of the release liner.

In another aspect, the present disclosure describes an article including a release liner having a release surface, a solidified ink pattern on the release surface of the release liner to form a passivation layer including a pattern of passivation features projecting away from the release surface, and a layer of adhesive on the release surface of the release liner. The passivation layer is sandwiched between the release liner and the layer of adhesive. The passivation features are at least partially embedded in a major surface of the layer of adhesive such that when the release liner is peeled from the layer of adhesive, the passivation layer remains with the layer of adhesive to form one or more selected areas on the major surface of the layer of adhesive. The selected areas have an adhesive functionality different from the major surface of the layer of adhesive.

Various unexpected results and advantages are obtained in exemplary embodiments of the disclosure. One such advantage of exemplary embodiments of the present disclosure is that an ink pattern is directly printed on a release liner instead on adhesives. The release liner, as an integral portion of the final adhesive article, is provided to cover and protect the external surface of adhesive, where the ink pattern is at least partially embedded therein such that when the release liner is peeled from the adhesive, the ink pattern remains with the adhesive. Peeling the release liner from the adhesive layer can simultaneously create selected areas having modified adhesive functionality.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that:

The term "ink" refers to a liquid composition including a liquid carrier and/or one or more functional materials. The ink described herein can be printed onto a release liner surface and solidified to form pattern features thereon.

The term "fluoresce" or "fluoresces" with respect to an ink or ink pattern means the emission of light by a substance that has absorbed light or other actinic radiation. In most cases, the emitted light has a longer wavelength than the absorbed radiation. Preferably, the absorbed radiation is in the ultraviolet region of the electromagnetic spectrum and thus invisible to the human eye, while the emitted light is in the visible region to the human eye, which gives the fluorescent substance a distinct color that can only be seen when exposed to ultraviolet light.

The term "release liner" used herein refers to a layer of material which has a major surface easily-removable from an adhesive to provide subsequent bonding of adhesive to an object.

A release liner may include any conventional or developed material such as, for example, a silicone, release paper, for covering adhesive and which can be easily removed to provide subsequent bonding of adhesive to an object.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

The terms "about" or "approximately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Figures 1A, 1B:
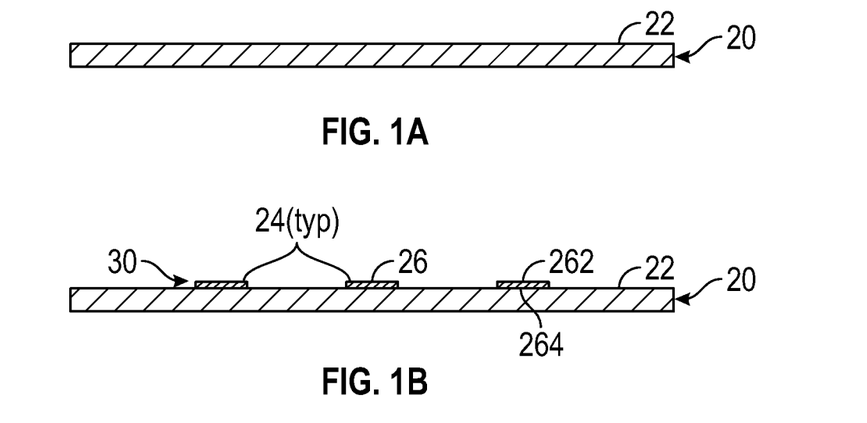
FIG. 1A is a schematic side view of a stage in an embodiment of a method according to the present disclosure.
FIG. 1B is a schematic side view of another stage in the embodiment of FIG. 1A.

Referring now to FIG. 1A-1D, several stages in an embodiment of a method according to the present disclosure are illustrated. In FIG. 1A, a release liner 20 with a release surface 22 is provided. Suitable release liners may include, for example, paper, e.g., Kraft paper, polymeric films, e.g., polyethylene, polypropylene or polyester, etc. At least one major surface of the release liner can be treated with a release agent such as, for example, silicone, a fluorochemical, or other low surface energy based release material to provide the release surface 22. Suitable release liners and methods for treating liners are described in, for example, U.S. Pat. No. 4,472,480 (Olson), U.S. Pat. No. 4,980,443 (Kendziorski et al.) and U.S. Pat. No. 4,736,048 (Brown et al.), and incorporated herein by reference. In some embodiments, preferred release liners may include fluoroalkyl silicone or silicone polycoated paper. The release liner can be printed with lines, brand indicia, or other information.

In FIG. 1B, an ink pattern 24 including an array of ink features 26 is printed on the release surface 22 of the release liner. Suitable ink compositions can be used herein such that the ink features 26 wet out onto the release surface 22. In some embodiments, the ink composition may include a liquid carrier and one or more non-adhesive materials such as, for example, non-adhesive polymers. In general, the ink may have a low surface energy, and may be potentially fast drying. In some embodiments, the ink may contain packages of solvent and surfactant that can significantly reduce the surface tension. In some embodiments, the ink may include fast drying solvent(s).

The ink can be printed on the release surface 22 by various processes including, for example, flexographic printing, gravure printing, screen printing, ink jet printing, dispensing such as piezo dispensing, needle dispensing, etc. In some embodiments, the ink pattern 24 can be preferably formed on the release surface 22 by flexographic printing. When the ink pattern 24 is printed, the ink features 26 can be solidified to form an array of passivation features. Suitable solidification processes may include, for example, curing or evaporating by heat or radiation. The formed passivation features may be substantially free of pinholes, for example, the volume of pinholes being less than 10%, less than 5%, less than 2%, less than 1%, less than 0.5%, or less than 0.2% of the volume of the printed ink material.

Collectively, the solidified ink pattern 24 can make up at least a portion of a passivation layer 30. In some embodiments, the passivation features 26 of the passivation layer 30 can include continuous stripes or lines. In some embodiments, the passivation features 26 of the passivation layer 30 can include discrete patches or areas of printed materials. In some embodiments, the array of passivation features 26 may form a discrete pattern, e.g., adjacent passivation features disconnected with each other. In some embodiments, the pattern of discrete passivation features 26 includes an array of dots, or other shapes such as ovals.

Each of the passivation features 26 may project away from the release surface 22. A bottom surface 264 of the passivation feature 26 contacts to the release surface 22 of the release liner 20, and an opposite, upper surface 262 projects away from the release surface 22. The bottom surface 264 may have a texture or pattern conformal with that of the release surface 22. The upper surface 262 may have a shape conformal with the bottom surface 264.

In some embodiments, the passivation features 26 may have an average thickness (i.e., the distance between the opposite surfaces 262 and 264 thereof), for example, from about 0.1 to about 20 micrometers, from about 0.5 to about 20 micrometers, or from about 1 to about 20 micrometers. In some embodiments, the passivation features 26 may have a minimum lateral dimension of, for example, from about 50 micrometers to about 25 mm, from about 100 micrometers to about 10 mm, or from about 200 micrometers to about 10 mm. It is to be understood that the passivation feature 26 may include continuous stripes that can extend for, for example, several centimeters or greater.

Figure 1C:
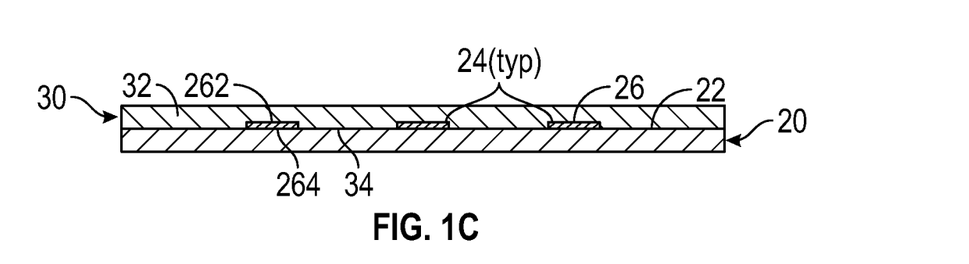
FIG. 1C is a schematic side view of another stage in the embodiment of FIG. 1A.

Referring now to FIG. 1C, a layer of adhesive 32 is applied onto the release surface 22, with the passivation layer 30 being sandwiched between the release liner 20 and the layer of adhesive 32. In some embodiments, the layer of adhesive 32 can completely cover the passivation layer 30 where the upper surface 262 of the passivation feature 26 can be embedded within the layer of adhesive 32. The layer of adhesive 32 may have an average thickness of, for example, from about 25 to about 1000 micrometers, from about 50 to about 800 micrometers, from about 100 to about 800 micrometers, or from about 200 to about 800 micrometers.

Figure 3A:
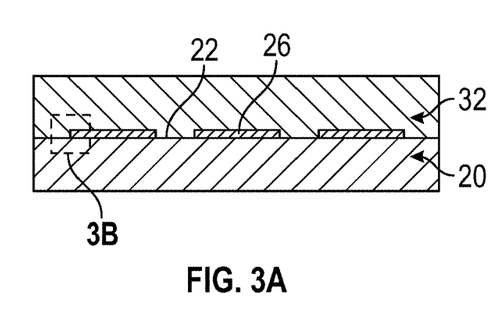
FIG. 3A is a cross sectional view of an article, according to one embodiment.
Figure 3B:
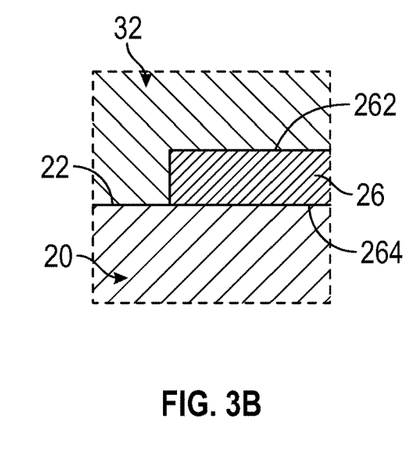
FIG. 3B is an enlarged portion of the article of FIG. 3A.
Figure 3C:
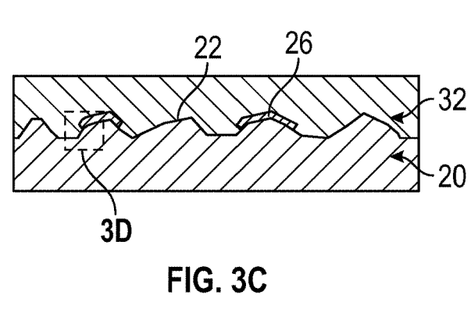
FIG. 3C is a cross sectional view of an article, according to another embodiment.
Figure 3D:
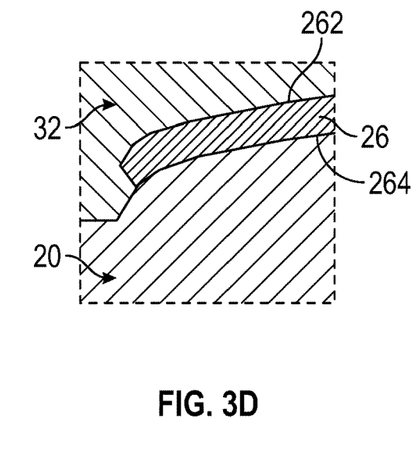
FIG. 3D is an enlarged portion of the article of FIG. 3C.
Figure 3E:
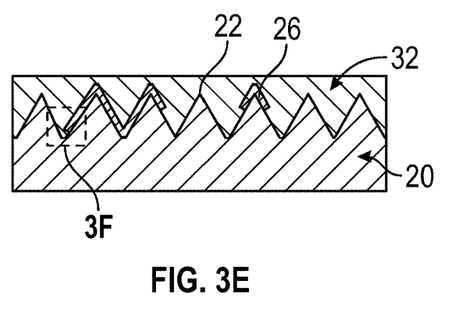
FIG. 3E is a cross sectional view of an article, according to another embodiment.
Figure 3F:
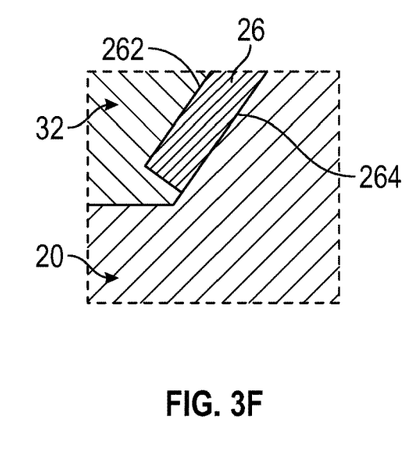
FIG. 3F is an enlarged portion of the article of FIG. 3E.

In the present disclosure, the release surface 22 of the release liner 20 can be various surfaces. In some embodiments, the release surface 22 can be a substantially planar surface such as shown in FIGS. 3A-B. The opposite surfaces 262 and 264 of the passivation feature 26 can be substantially planar. The release liner 20 can be made of a polymeric material such as, for example, poly(ethylene terephthalate) (PET). In some embodiments, the release surface 22 may have a random roughness such as shown in FIGS. 3C-D. The release liner 20 can be made of, for example, paper. The surface roughness may have dimensions comparable to that of the passivation features 26 which are conformal with the rough surface, having the surface 264 in direct contact with the release surface and the opposite surface 262 embedded in the adhesive layer 32. In some embodiments, the release surface 22 can be an engineered surface having a surface pattern or texture which can be formed, for example, by micro-replication. The passivation features 26 are conformal with the engineered surface, having the surface 264 in direct contact with the release surface 22 and the opposite surface 262 embedded in the adhesive layer 32.

In some embodiments, the layer of adhesive 32 may be applied as an adhesive fluid with any of several convenient coating techniques such as, for example, slot coating, curtain coating, notched bar coating, Mayer rod coating, flexographic printing, etc. In some convenient embodiments, the fluid can be cured with, e.g., thermal, UV or e-beam radiation. In other convenient embodiments, the fluid can be dried through solvent evaporation through active or passive drying. The raised passivation features 26 can be at least partially embedded in a first major surface 34 of layer of adhesive 32 to make a conformal contact therebetween.

In some embodiments, the layer of adhesive 32 may be applied onto the release surface 22 in form of a solid layer. The layer of adhesive 32 can be first formed on a surface of a substrate, e.g., a backing layer such as a backing layer 44 of FIG. 1D, by any suitable methods. The layer of adhesive 32 can then be laminated onto the release surface 22 of the release liner 20. During the lamination, the raised passivation features 26 can be at least partially embedded into the first major surface 34 of layer of adhesive 32. In some embodiments, the layer of adhesive 32 can be softened by heating to facilitate the embedment of the raised passivation features 32 into the first major surface 34 of layer of adhesive 32.

The layer of adhesive 32 can include any suitable adhesive materials having the desired properties. The layer of adhesive 32 can be peelable or stretch releasable and peelable from an object surface. In some embodiments, the adhesive may include a pressure sensitive adhesive (PSA). A general description of useful pressure-sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in the pressure-sensitive adhesive. Exemplary pressure-sensitive adhesives utilize one or more thermoplastic elastomers, e.g. in combination with one or more tackifying resins. In some embodiments, the adhesive may not be a pressure sensitive adhesive.

In some embodiments, the adhesive can include at least one of rubber, silicone, or acrylic based adhesives. In some embodiments, the adhesive can include tackified rubber adhesives, such as natural rubber; olefins; silicones, such as silicone polyureas or silicone block copolymers; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above. The adhesive can be, for example, any of the adhesives described in any of the following patent applications, all of which are incorporated by reference herein: PCT Patent Publication Nos. 2015/035556, 2015/035960, and US 2015/034104.

In some embodiments, adhesion properties of the adhesive can range from 0 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm. In some embodiments, a more permanent adhesion can be provided by the peelable adhesive layer such that a mounting surface may be damaged after removing the peelable adhesive layer therefrom.

Figure 1D:
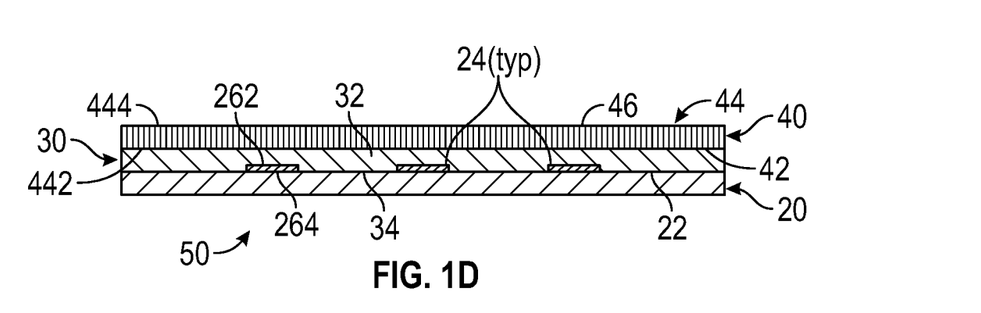
FIG. 1D is a schematic side view of another stage in the embodiment of FIG. 1A.

Referring now to FIG. 1D, the exemplary method continues with the attaching of a device 40 to the layer of adhesive 32 on a second side 42 opposite the first side 34. In FIG. 1D, the device 40 is in the form of the backing layer 44 laminated on the layer of adhesive 32. It is to be understood that any other suitable devices can be contemplated as within the scope of the present disclosure. At this point an article 50 can be formed. As will be discussed with more particularity below in connection with FIG. 6, other apparatus can be attached to the backing layer 44 on the side 46 opposite the layer of adhesive 32.

The article 50 includes the release liner 20 having the release surface 22. The solidified ink pattern 24 on the release surface 22 forms the passivation layer 30. The passivation layer 30 include a pattern of passivation features 26 projecting away from the release surface 22. The layer of adhesive 32 is disposed on the release surface 22 of the release liner 20. The passivation layer 30 is sandwiched between the release liner 20 and the layer of adhesive 32.

In the depicted embodiment of FIG. 1D, the passivation features 26 are at least partially embedded in the major surface 34 of the layer of adhesive 32 such that when the release liner 20 is peeled from the layer of adhesive 32, the passivation layer 30 remains with the layer of adhesive 32 to form one or more selected areas on the major surface 34 of the layer of adhesive 32. The one or more selected areas can have an adhesive functionality different from the rest areas of the adhesive layer 32.

Figure 4A:
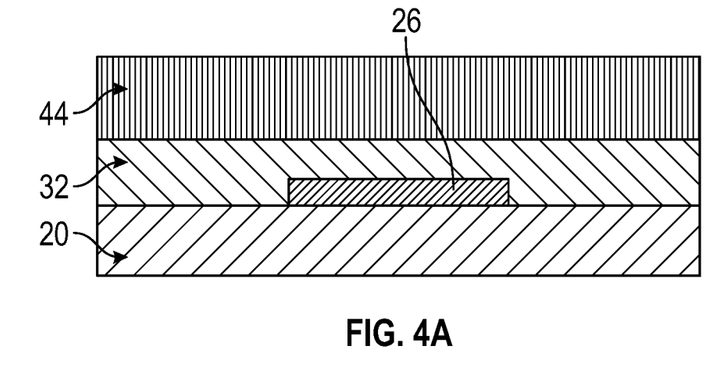
FIG. 4A is a cross sectional view of an article, according to one embodiment.
Figure 4B:
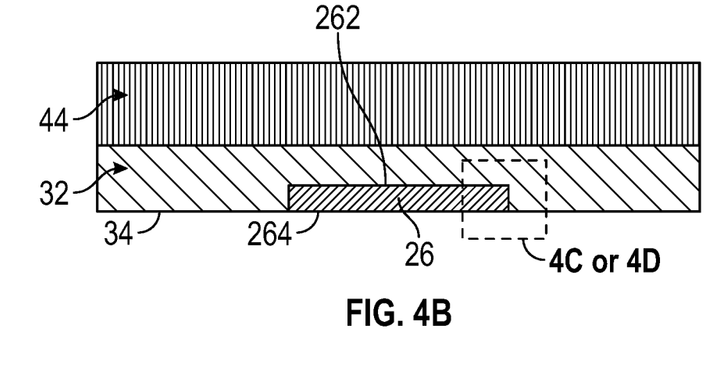
FIG. 4B is a cross sectional view of the article of FIG. 4A with the release liner removed.
Figure 4C:
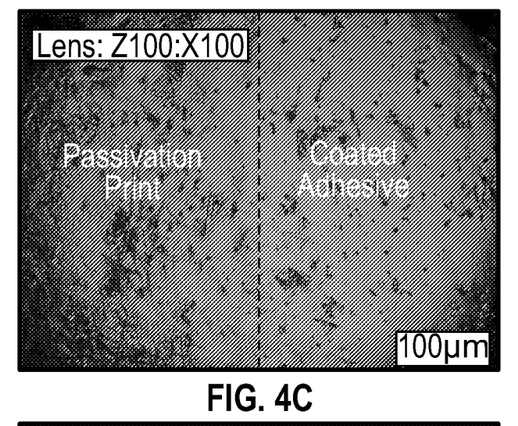
FIG. 4C is an optical image of the surface of Example 2 at a corresponding enlarged portion in FIG. 4B.
Figure 4D:
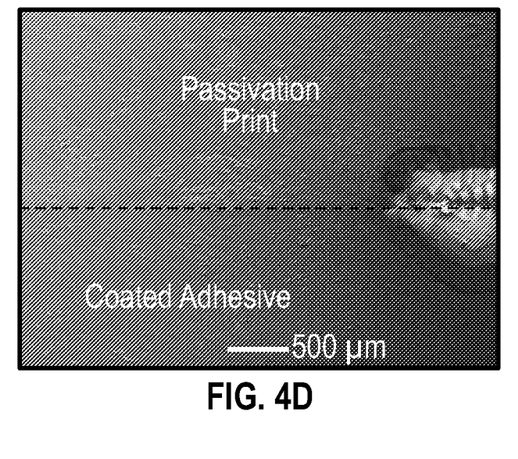
FIG. 4D is an electro-microscopic image of the surface of Example 2 at a corresponding enlarged portion in FIG. 4B.

When the release liner 20 is peeled from the layer of adhesive 32, the solidified ink pattern 24 remains with the adhesive layer 32, and the surfaces 264 of passivation features 26 are exposed. In one embodiment as shown in FIGS. 4A-D, the passivation features 26 can be completely embedded in the adhesive layer 32 and the exposed surface 264 is substantially coplanar with the major surface 34 of the adhesive layer 32 after the release liner 20 is removed. This may be obtained when the adhesive layer 32 is formed from an adhesive fluid applied onto the release liner 20. For example, the surface images of Example 2 in FIG. 4C-D show that the passivation print is coplanar with the adhesive. In another embodiment as shown in FIGS. 5A-D, the passivation features 26 may be partially embedded in the adhesive layer 32 and the exposed surface 264 projects away from the major surface 34 of the adhesive layer 32 after the release liner 20 is removed. This may be obtained when the adhesive layer 32 is applied onto the release liner 20 as a solid adhesive layer.

Figure 5A:
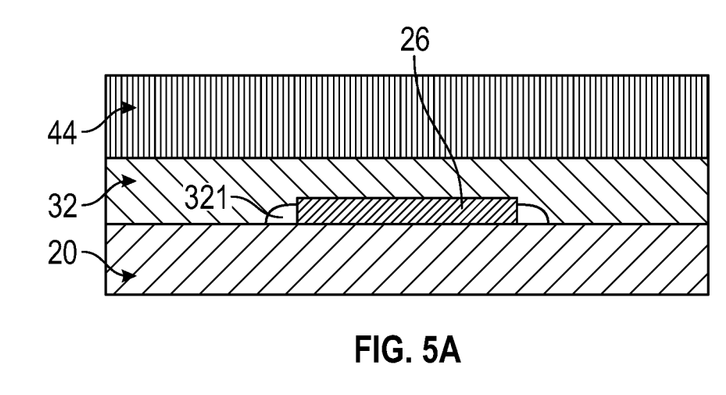
FIG. 5A is a cross sectional view of an article, according to one embodiment.
Figure 5B:
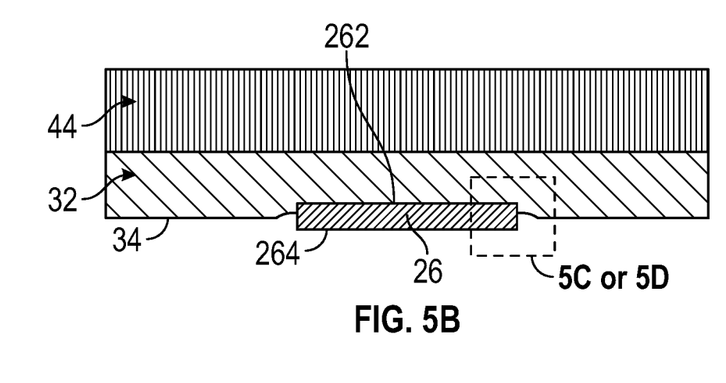
FIG. 5B is a cross sectional view of the article of FIG. 5A with the release liner removed.
Figure 5C:
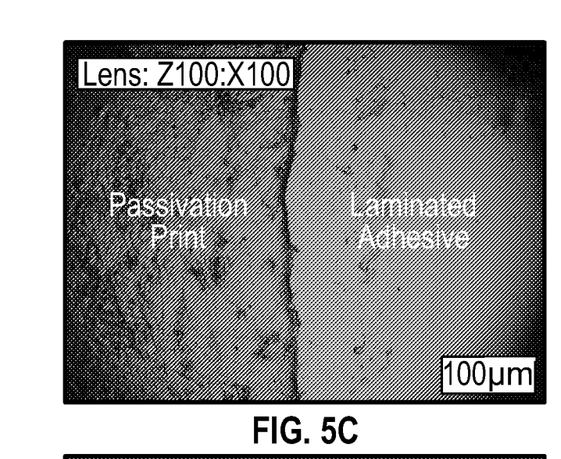
FIG. 5C is an optical image of the surface of Example 1 at a corresponding enlarged portion in FIG. 5B.
Figure 5D:
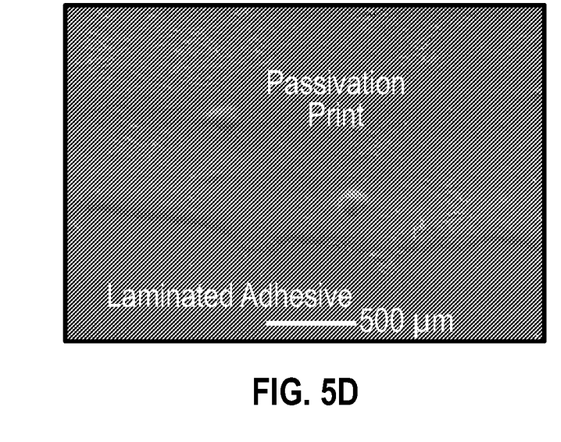
FIG. 5D is an electro-microscopic image of the surface of Example 1 at a corresponding enlarged portion in FIG. 5B.

Depending on the stiffness of the adhesive layer 32 and/or the thickness of the passivation feature 26, the adhesive layer 32 may not deform easily to allow conform coverage at the edges of passivation feature 26. A small gap 321 may be formed at the edges. When the release liner 20 is removed, the passivation feature 26 may partially protrude from the adhesive layer 32. For example, the surface images of Example 1 in FIG. 5C-D show that the passivation print protrudes from the adhesive. In some embodiments, the portion of the passivation feature 26 that projects away from the major surface 34 of the adhesive layer 32 may account for, for example, about 10 vol. % or greater, about 20 vol. % or greater, about 30 to vol. % or greater, about 40 vol. % or greater, or about 50 vol. % or greater; the portion may account for, for example, about 80 vol. % or less, about 70 vol. % or less, about 60 vol. % or less, about 50 vol. % or less, or about 40 vol. % or less, of the total volume of passivation feature 26.

Referring again to FIG. 1D, the backing layer 44 has a first major surface 442 and a second major surface 444 opposite the first major surface 442. The layer of adhesive 32 is disposed on the surface 442. In some embodiments, the backing layer 44 may have sufficient flexibility so that a user can easily remove the article 50 from a mounting surface by peeling. In some embodiments, the backing layer 44 can also provide conformability and resiliency properties which are helpful when the article 50 is to be adhered to a mounting surface having surface irregularities.

In some embodiments, the backing layer 44 can include a flexible polymeric foam layer. In some embodiments, the flexible backing layer 44 can include a flexible polymeric film. In some embodiments, the flexible backing layer 44 can include multiple layers that include one or more polymeric foam layers, and/or one or more polymeric films. In some embodiments, the backing layer 44 may have a multilayer structure including a second layer of adhesive for bonding the multilayer structure and/or additional rigid elements such as, for example, a hanging device.

In some embodiments, the backing layer 44 can be utilized with the adhesive layer 32 to form a solid adhesive backing layer, which can be laminated as a whole onto the release surface 22 to cover the passivation layer 30, as discussed above. In one embodiment, the adhesive layer 32 can be directly coated onto the surface 442 of the backing layer 44. In another embodiment, the adhesive layer 32 can be formed as a separate layer and then later laminated to the backing layer 44. In some embodiments, two or more sub-layers can be co-extruded so as to provide the backing layer 44. The backing layer 44 can have suitable conformability and resiliency properties, which are helpful when the backing layer 44 along with the adhesive layer 32 is laminated onto the release surface 22, the raised passivation features 26 can be at least partially embedded into the adhesive layer 32.

In some embodiments, the backing layer 44 can be a composite foam that includes a flexible polymeric foam layer, a first film laminated to a first major surface of the foam layer, and a second film laminated to a second, opposite major surface of the foam layer. The layer of adhesive 32 can be attached to the films to form a structure of adhesive-film-foam-film-adhesive. The flexible polymeric foam layer can be chosen to optimize conformability and resiliency properties which are helpful when the flexible adhesive tape structure 12 is to be adhered to surfaces having surface irregularities. Such is the case with a typical wall surface.

Representative examples of materials suitable for the backing layer 44 can include, for example, polyolefins, such as polyethylene, including high density polyethylene, low density polyethylene, linear low density polyethylene, and linear ultra-low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadienestyrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

Figure 2:
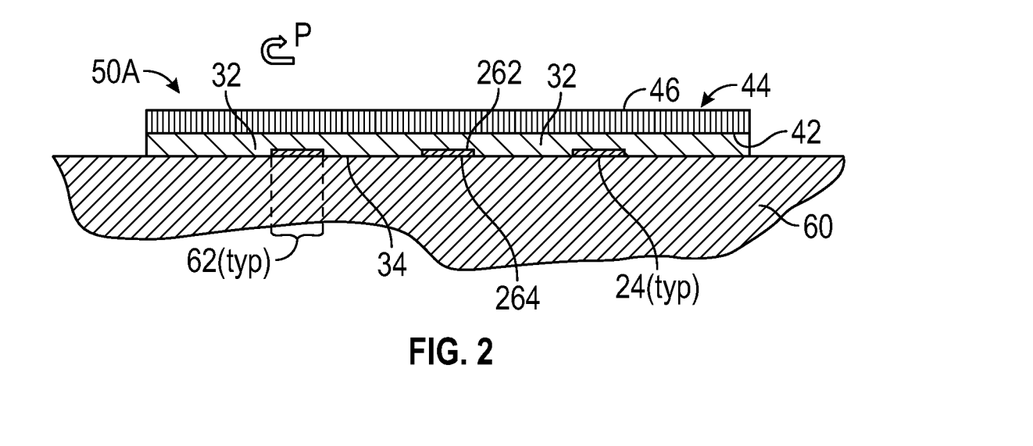
FIG. 2 is a schematic side view of a portion of the article formed in FIG. 1D is illustrated adhered to an adherend.

Referring now to FIG. 2 a schematic side view of a portion 50A of the article 50 (in FIG. 1D) is illustrated adhered to an adherend 60. In this view the release liner 20 has been peeled from layer of adhesive 32, and importantly the passivation layer 30 has remained with layer of adhesive 32 to form one or more selected areas 62 on the major surface 34 of layer of adhesive 32. The selected areas 62, formed by e.g., the solidified ink pattern 24, have an adhesive functionality different from the rest of major surface 34 of the layer of adhesive 32. One benefit of such an arrangement is that if some rigid element has been attached to the film 44 on the side 46 opposite the adhesive layer 32, and that rigid element is opposite the selected areas 62, the article 50A may be removed from adherend 60 by, e.g., a peeling action in direction "P" without damaging the adherend 60.

Figure 6:
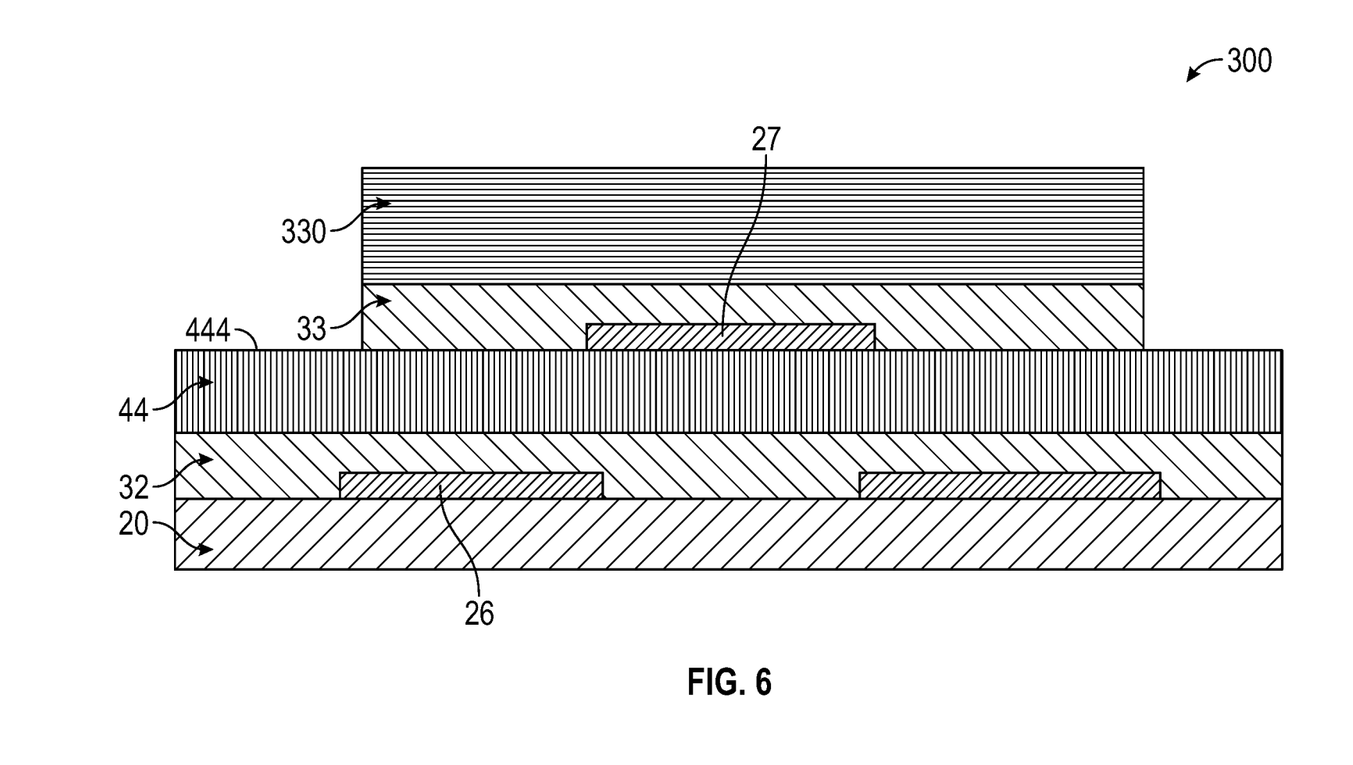
FIG. 6 is a cross sectional view of an adhesive assembly, according to one embodiment.

Referring now to FIG. 6, an article 300 includes the release liner 20 having a release surface. A solidified ink pattern including the passivation features 26 are formed on the release surface of the release liner 20. The passivation features 26 project away from the release surface and are covered by the adhesive layer 32. The passivation features 26 are at least partially embedded in a major surface of the adhesive layer 32 such that when the release liner 20 is peeled from the adhesive layer 32, the passivation features 26 remain with the adhesive layer 32 to form one or more selected areas on the major surface of the adhesive layer 32. The one or more selected areas having an adhesive functionality different from the major surface of the adhesive layer 32.

The adhesive layer 32 is disposed on the backing layer 44. A multilayer structure can be formed on the surface 444 of the backing layer 44 on the side opposite to the release liner 20. In the depicted embodiment, a second ink pattern including second passivation features 27 can be formed on the surface 444. The second passivation features 27 can be covered with a second adhesive layer 33. The second passivation features 27 can be made by similar processes for the passivation features 26. The second adhesive layer 33 can include any suitable adhesive materials and formed by any suitable processes. A device 330 can be attached to the second adhesive layer 33. In some embodiments, the device 330 can be a rigid device such as, for example, a hanging device.

When the release liner 20, as an integral portion of the article 300, is peeled from the adhesive layer 32, one or more selected areas, regions, or portions can be created on the exposed surface of the adhesive layer 32, which can exhibit an adhesive functionality different from the rest of adhesive areas. The one or more selected areas include a pattern of the passivation features 26, which are transferred from the release liner 20. The one or more selected areas may be non-adhesive areas that lack adhesive functionality or properties and/or are not significantly adhesive.

In some embodiments, one non-adhesive region including a pattern of the passivation features 26 may correspond to the footprint of the rigid device 330. In some embodiments, one non-adhesive region including a pattern of the passivation features 26 may be located on an edge of the article 300, forming a tab which can be easily accessed by the user to assist in or begin to remove the article 300 from an adherend.

In certain presently-preferred embodiments, the ink pattern is a latent ink pattern which fluoresces on exposure to a source of actinic radiation having a selected emission wavelength spectrum. In such presently-preferred embodiments, the method further includes exposing the ink pattern to the source of actinic radiation to cause the ink pattern to fluoresce, detecting the fluorescing ink pattern, and registering a die cutting operation to the detected fluorescing ink pattern to cut through at least the adhesive layer and the passivation layer.

The source of actinic radiation may be selected to be any type of radiation emitter, although a lamp or bulb is presently-preferred. The source of actinic radiation may be selected to emit radiation (e.g., light) in the ultraviolet (between 10 and 400 nm), visible (from 400 to 750 nm), or infra-red (greater than 750 nm) emission wavelength spectrum.

In certain presently-preferred embodiments, the source of actinic radiation is a source of ultraviolet actinic radiation (e.g., ultraviolet light) having an emission wavelength spectrum between 10 and 400 nm, the fluorescing ink pattern emits ultraviolet radiation (i.e., light) at an emission wavelength spectrum between 400 nm to 750 nm, corresponding to light visible to the unaided human eye, and the latent ink pattern includes a dye or pigment that fluoresces on exposure to the source of ultraviolet actinic radiation. One suitable commercially-available source of ultraviolet actinic radiation is the UV Ray Maxell 550, manufactured by UV RAY SRL (Cornaredo, Milan, Italy).

Preferably, the ink used to produce the fluorescing ink pattern is a liquid ink comprising a fluorescent dye or pigment dissolved or dispersed in a solvent, dispersion medium, or other liquid carrier vehicle for the ink. Preferably, the liquid carrier vehicle is a dispersion medium in which a fluorescent pigment is dispersed. Suitable commercially-available fluorescent inks include, for example, FLG5466 Ultra Violet (UV) Fluorescent Ink available from GEM Ink, Inc. (West Hanover, Mass.); x-nano™ UV Blue 460, x-nano™ UV Green 545, x-nano™ UV Green-Yellow 550, x-nano™ UV Yellow-Green 560, x-nano™ UV Red 615, x-nano™ IR-783, x-nano™ IR-820, and x-nano™ IR-1040, all available from Diversified Nano Solutions Corporation (San Diego, Calif.); DYKEM Industrial UV Ink available from W. W. Grainger, Inc. (Chicago, Ill.); VersaInk Invisible Blue Fluorescent Ink available from ( ); UV-Fluorescent and Infrared (IR) Fluorescent Inks available from Flint Group Narrow Web (Trelleborg, Sweden); Invisible UV Inks (and Pigments) available from Risk Reactor Inc. (Santa Ana, Calif.); and Anti-counterfeiting Inks available from Code Tech Corp. (Princeton, N.J.).

Suitable fluorescent dyes and pigments are described, for example, in "Fluorescent Dyes and Pigments;" Rami Ismael, Hansrudolf Schwander, and Paul Hendrix, eds.; *Ullmann's Encyclopedia of Industrial Chemistry* (Wiley-VCH Verlag GmbH & Co.), published on-line on Sep. 16, 2013. Certain presently-preferred fluorescent pigments include fluorescent optical brighteners sold under the trade names TINOPOL OB CO, TINOPOL SFP and TINOPOL NFW, available from BASF Corp. (Southfield, Mich.).

Preferably, the ink pattern is a latent ink pattern, that is, the ink pattern is invisible or transparent when viewed by the unaided human eye when viewed at a distance of 1 meter, but becomes visible to the unaided eye when viewed at a distance of 1 meter on exposure to a source of actinic radiation having a selected emission wavelength spectrum suitable to cause the fluorescent dye or pigment to emit actinic radiation or fluoresce.

Suitable photodetectors for detecting the fluorescing ink pattern include, but are not limited to, photocells, photoelectric detectors, photo diodes, charge coupled devices (CCDs), and the like. Suitable commercially-available photodetectors are manufactured by TRI-TRONICS, Inc., (Tampa, Fla.). One suitable commercially-available photodetector for detecting the fluorescing ink pattern is the SmartEye™ Stealth UV Detector available from TRI-TRONICS, Inc., (Tampa, Fla.), which incorporates a UV light source with a photoelectric detector in a single package.

In certain exemplary embodiments, detecting the fluorescing ink pattern is done through at least one of the release liner or the layer of adhesive. In one presently-preferred embodiment, detecting the fluorescing ink pattern is done through the release liner, e.g., by positioning a detector on the back-side of the release liner opposite the release surface. In other exemplary embodiments, detecting the fluorescing ink pattern is done through the layer of adhesive, e.g., by positioning a detector on the front side of the release liner opposite the layer of adhesive.

In some exemplary embodiments, the latent ink pattern includes a fiducial mark that can be used to register the die cutting operation. Exemplary fiducial marks and their use to register various processing steps are described, for example, in U.S. Pat. Nos. 8,992,104 and 9,807,871 (Carlson et al.); U.S. Pat. No. 9,766,732 (Gilman et al.); U.S. Pat. Nos. 9,322,093 and 9,556,510 (Pekurovsky, et al.); and U.S. Pat. Nos. 8,847,185, 9,296,583 and 9,807,871 (Theis et al.).

In some exemplary embodiments, the die cutting operation is a kiss cutting operation in which the release liner is not cut through by the cutting die. The term "cutting die" refers to a die plate or rotary tool having a pattern machined into its face as a cutting feature. The pattern may represent the desired artwork to be formed on a substrate when the cutting feature engages with the substrate surface.

The term "cut" or "cutting" includes, for example, cut-through, perforated, scored or kiss cut and controlled depth cut segments of a web that is typically a part of or used to make an article. The term "Cut through" means that all the layer(s) of a web or an article have been cut. The term "Perforated" means that a segment of the layers of a web or article has been cut-through but sufficient portions of the web/article adjacent or near the cut through segments have been left intact so that the cut segment may not be separate from a main segment(s) of the web without first pulling about or breaking the intact segment(s) of the web. The equivalent terms "Scored" or "kiss cut" means that the cut extends to a specific layer or depth of a web or article without completely penetrating every layer.

The use of bearer bars can assist in setting the depth of the kiss cut. Typically, this would entail cutting through a coated layer to a liner, but may also include cutting the coated layer to a specific predetermined depth.

It is presently-preferred to use a rotary die cutting apparatus in a kiss cutting operation in which the release liner is not cut through by the cutting die. One suitable commercially-available rotary die cutting apparatus is Model: MR12414 manufactured by Wilson Manufacturing Company (St. Louis, Mo.). Suitable die plates may be obtained as Model: FC86745 from Flexible Cutting Systems (St. Louis, Mo.).

The present disclosure also provides methods of selectively passivating an adhesive via printing an ink pattern onto a release liner and transfer the ink pattern to the adhesive. The ink pattern is directly printed on the release liner instead on the adhesive. The release liner is provided to cover and protect the external surface of adhesive, where the ink pattern is at least partially embedded therein such that when the release liner is peeled from the adhesive, the ink pattern remains with the adhesive. Peeling the release liner from the adhesive layer can simultaneously create selected areas having modified adhesive functionality. When the ink pattern has a composition including a non-adhesive material, the selected areas may exhibit as non-adhesive regions lacking significant adhesive properties. When the ink pattern has a composition including an adhesive material, the selected areas may still exhibit adhesive properties, but different from the rest areas of the adhesive.

The operation of the present disclosure will be further described with regard to the following embodiments. These embodiments are offered to further illustrate the various specific and preferred embodiments and techniques. It should be understood, however, that many variations and modifications may be made while remaining within the scope of the present disclosure.

Listing of Exemplary Embodiments

It is to be understood that any one of embodiments 1-11 and 12-23 can be combined.

Embodiment 1 is a method comprising:
  providing a release liner having a release surface;
  printing an ink pattern onto the release surface of the release liner to form a passivation layer, the passivation layer including a pattern of passivation features projecting away from the release surface; and
  providing a layer of adhesive onto the release surface of the release liner, the passivation layer being sandwiched between the release liner and the layer of adhesive,
  wherein the passivation features are at least partially embedded in a major surface of the layer of adhesive such that when the release liner is peeled from the layer of adhesive, the passivation layer remains with the layer of adhesive to form one or more selected areas on the major surface of the layer of adhesive, the one or more selected areas having an adhesive functionality different from the rest of the major surface of the layer of adhesive.

Embodiment 2 is the method of embodiment 1, wherein providing the layer of adhesive comprises laminating a layer of pressure sensitive adhesive (PSA) onto the release surface of the release liner.

Embodiment 3 is the method of embodiment 2, wherein the layer of PSA is disposed on a substrate before the laminating.

Embodiment 4 is the method of any one of embodiments 1-3, wherein providing the layer of adhesive comprises fluidly coating a layer of adhesive onto the release surface of the release liner.

Embodiment 5 is the method of embodiment 4, wherein the passivation features are embedded in the layer of adhesive.

Embodiment 6 is the method of any one of embodiments 1-5, wherein the passivation features have an exposed surface substantially coplanar with the major surface of the layer of adhesive after the removal of the release liner.

Embodiment 7 is the method of any one of embodiments 1-6, wherein the passivation features have an exposed surface projecting away from the major surface of the layer of adhesive after the removal of the release liner.

Embodiment 8 is the method of any one of embodiments 1-7, wherein the pattern of passivation features includes an array of dots.

Embodiment 9 is the method of any one of embodiments 1-8, wherein the passivation features have an average thickness of about 0.1 to about 20 micrometers.

Embodiment 10 is the method of any one of embodiments 1-9, further comprising attaching a device to the layer of adhesive on the side opposite the release liner.

Embodiment 11 is the method of embodiment 10, wherein attaching the device further comprises laminating a backing layer on the layer of adhesive and attaching a rigid element on the backing layer on the side opposite the layer of adhesive.

Embodiment 12 is the method of embodiments 1-10, wherein the ink pattern is a latent ink pattern which fluoresces on exposure to a source of actinic radiation having a selected emission wavelength spectrum, the method further comprising:

exposing the ink pattern to the source of actinic radiation to cause the ink pattern to fluoresce, detecting the fluorescing ink pattern through at least one of the release liner or the layer of adhesive; and registering a die cutting operation to the detected fluorescing ink pattern to cut through at least the adhesive layer and the passivation layer, optionally wherein the release liner is not cut through.

Embodiment 13 is the method of embodiment 12, wherein the source of actinic radiation is selected to be a source of ultraviolet radiation, and the latent ink pattern includes a dye or pigment that fluoresces on exposure to the source of ultraviolet radiation.

Embodiment 14 is an article comprising:

a release liner having a release surface;

a solidified ink pattern on the release surface of the release liner to form a passivation layer, optionally wherein the solidified ink pattern is a latent ink pattern which fluoresces on exposure to a source of actinic radiation having a selected emission wavelength spectrum, the passivation layer including a pattern of passivation features projecting away from the release surface; and a layer of adhesive on the release surface of the release liner, the passivation layer being sandwiched between the release liner and the layer of adhesive, wherein the passivation features are at least partially embedded in a major surface of the layer of adhesive such that when the release liner is peeled from the layer of adhesive, the passivation layer remains with the layer of adhesive to form one or more selected areas on the major surface of the layer of adhesive, the one or more selected areas having an adhesive functionality different from the major surface of the layer of adhesive.

Embodiment 15 is the article of embodiment 14, wherein the layer of adhesive comprises a pressure sensitive adhesive (PSA).

Embodiment 16 is the article of embodiment 14 or 15, wherein the passivation features are completely embedded in the major surface of the layer of the adhesive, and when the release liner is peeled from the layer of adhesive, the passivation features have an exposed surface substantially coplanar with the major surface of the layer of adhesive.

Embodiment 17 is the article of any one of embodiments 14-16, wherein the passivation features are partially embedded in the major surface of the layer of the adhesive, and when the release liner is peeled from the layer of adhesive, the passivation features have an exposed surface projecting away from the major surface of the layer of adhesive.

Embodiment 18 is the article of any one of embodiments 14-17, wherein the pattern of passivation features includes an array of dots.

Embodiment 19 is the article of any one of embodiments 14-18, wherein the passivation features have an average thickness of about 0.1 to about 20 micrometers.

Embodiment 20 is the article of any one of embodiments 14-19, further comprising a device attached to the layer of adhesive on the side opposite the release liner, the device comprising a backing laminated on the layer of adhesive and a rigid element attached to the backing on the side opposite the layer of adhesive.

Embodiment 21 is the article of any one of embodiments 14-20, wherein the rigid element has a footprint on the backing corresponding to a first of the selected areas on the major surface of the layer of adhesive.

Embodiment 22 is the article of embodiment 21, wherein the first selected area is surrounded by the rest of the major surface of the layer of adhesive.

Embodiment 23 is the article of any one of embodiments 20-22, wherein the device has a multilayer structure including a backing layer attached to the layer of adhesive, a second layer of adhesive attached to the backing layer, a second passivation layer including a plurality of passivation features sandwiched between the backing layer and the second layer of adhesive, and a rigid element attached to the second layer of adhesive.

Embodiment 24 is the article of any one of embodiments 20-23, wherein one of the selected areas on the major surface of the layer of adhesive is located on an edge of the layer of adhesive to form a tab.

Embodiment 25 is the article of any one of embodiments 20-24, wherein the passivation features have a minimum lateral dimension of about 50 micrometers to about 25 mm.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides abbreviations and a source for all materials used in the Examples below:

TABLE 1

| Abbreviation | Description | Source |
|---|---|---|
| Sun Chemical TrueWeather Red Ink | Nitrocellulose based solvent ink | Sun Chemical, Parsippany, NJ, USA |
| Sun Chemical TrueWeather Clear Ink | Nitrocellulose based solvent ink | Sun Chemical, Parsippany, NJ, USA |
| Tinopol OB CO | Fluorescent Whitening Agent: 2,5-thiophenediylbis (5-tert-butyl-1,3-benzoxazole) | BASF Corp, Southfield, MI |
| 3M ScotchGard ® | Adhesive film coated with pressure sensitive adhesive (PSA) | 3M, Saint Paul, MN, USA |

Example 1

A Flexiproofer 100 was used to flexographically print an ink pattern onto a silicone-coated paper release liner. A 0.067" thick Dupont DPR flexo plate from SGS International (Geneva, Switzerland) was used to have an array of "3M" label features approximately 0.1 to 5 micrometers in height. Sun Chemical True Weather Red Ink was flexographically printed at 10 m/min, using a 20 BCM anilox roll to print passivation features onto the silicone-coated paper release liner. The ink wet out well onto the release liner, exhibiting substantially no visually observable de-wetting or pinholes.

Next, a 3M ScotchGard® adhesive film was laminated to the ink-printed release liner using a Chem Instruments Hot Roll Laminator. The release liner was removed from the adhesive film, resulting in transfer of the printed 3M features to the adhesive film. It was noted that the adhesive was deadened (i.e., exhibited substantially reduced tack) at selected areas where the ink pattern was transferred to the adhesive film.

Example 2

A Flexiproofer 100 was used to print Sun Chemical TrueWeather Red Ink onto a silicone-coated paper release liner using the same 3M stamp and 20 BCM anilox roll from Example 1. After the ink printing of passivation features, a 6 mil (150 micrometer) gap notched bar was used to coat an approximate 3 mil layer of pressure sensitive adhesive on the release liner. After removing the release liner, it was found that the passivation features successfully transferred away with the adhesive, deadening the adhesive in the selected areas.

Example 3

A web of silicone-coated paper release liner was prepared according to Example 1. A pattern of fiducial marks comprised of a latent fluorescent ink was flexographically printed onto the web in a roll-to-roll process. The latent fluorescent ink was TruWeather Clear ink made fluorescent by incorporation of 0.1% w/w of Tinopol OB CO. The fiducial marks were rectangles having a dimension of 3/16" (about 4.8 mm) in the down-web (i.e., machine) direction, and 3/8" (about 9.5 mm) in the cross-web direction, printed adjacent to and inward from each lateral edge of the web. The frequency of the fiducial marks was varied from a minimum of one fiducial mark for every revolution of the 24" (about 61 cm) circumference of the roller on which the flexo-plate was mounted, to a maximum of one fiducial mark every 4" (about 10.1 cm) circumferentially.

The release liner bearing the fiducial marks comprised of the latent fluorescent ink was then subjected to a rotary die cutting operation. A SmartEye™ Stealth integrated UV light source and UV photodetector, available from TRI-TRONICS, Inc., (Tampa, Fla.), was used to illuminate the fluorescent ink and detect the fluorescent fiducial marks through the release liner. The fiducial marks on one side of the release liner were used to trigger a rotary die cutting operation to effect kiss-cutting of the adhesive pattern previously printed on the opposite side of the release liner, with registration to within +/−4 mils (+/−100 micrometers).

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method comprising:
    providing a release liner having a release surface;
    printing an ink pattern onto the release surface of the release liner to form a passivation layer, the passivation layer including a pattern of passivation features projecting away from the release surface; and
    providing a layer of adhesive onto the release surface of the release liner, the passivation layer being sandwiched between the release liner and the layer of adhesive, wherein the passivation features are fully embedded in a major surface of the layer of adhesive such that when the release liner is peeled from the layer of adhesive, the passivation layer remains with the layer of adhesive to form one or more selected areas on the major surface of the layer of adhesive, the one or more selected areas having an adhesive functionality different from remaining areas of the major surface of the layer of adhesive, and further wherein the fully embedded passivation features have an exposed surface substantially coplanar with the major surface of the layer of adhesive after the release liner is peeled from the layer of adhesive.

2. The method of claim 1, wherein providing the layer of adhesive comprises laminating a layer of pressure sensitive adhesive (PSA) onto the release surface of the release liner.

3. The method of claim 2, wherein the layer of pressure sensitive adhesive is disposed on a substrate before the laminating.

4. The method of claim 1, wherein providing the layer of adhesive comprises fluidly coating a layer of adhesive onto the release surface of the release liner.

5. The method of claim 1, wherein the pattern of passivation features includes an array of dots.

6. The method of claim 1, wherein the passivation features have an average thickness from about 0.1 to about 20 micrometers.

7. The method of claim 1, further comprising attaching a device to the layer of adhesive on a side opposite the release liner.

8. The method of claim 7, wherein attaching the device further comprises laminating a backing layer on the layer of adhesive and attaching a rigid element on the backing layer on the side opposite the layer of adhesive.

9. The method of claim 1, wherein the ink pattern is a latent ink pattern which fluoresces on exposure to a source of actinic radiation having a selected emission wavelength spectrum, the method further comprising:
  exposing the latent ink pattern to the source of actinic radiation to cause the latent ink pattern to fluoresce, detecting the fluorescing latent ink pattern through at least one of the release liner or the layer of adhesive; and
  registering a die cutting operation to the detected fluorescing latent ink pattern to cut through at least the layer of adhesive and the passivation layer, optionally wherein the release liner is not cut through.

10. The method of claim 9, wherein the source of actinic radiation is selected to be a source of ultraviolet radiation, and the latent ink pattern includes a dye or pigment that fluoresces on exposure to the source of ultraviolet radiation.

\* \* \* \* \*